United States Patent [19]

MacNeil

[11] Patent Number: 4,715,526
[45] Date of Patent: Dec. 29, 1987

[54] FLOATING SEAL AND METHOD OF ITS USE

[75] Inventor: Douglas E. MacNeil, West Covina, Calif.

[73] Assignee: General Dynamics, Pomona Division, Pomona, Calif.

[21] Appl. No.: 932,848

[22] Filed: Nov. 20, 1986

[51] Int. Cl.[4] .............................................. B23K 37/04
[52] U.S. Cl. ................... 228/219; 228/180.2; 228/6.2
[58] Field of Search ............... 228/219, 220, 180.2, 228/42, 6.2, 44.7; 269/37, 43, 71, 73

[56] References Cited

U.S. PATENT DOCUMENTS

| | | |
|---|---|---|
| 628,671 | 7/1899 | Newman . |
| 1,552,369 | 9/1925 | White . |
| 1,749,765 | 3/1930 | Hendrickson . |
| 2,595,012 | 4/1952 | Smith ................................ 251/27 |
| 3,286,066 | 11/1956 | Floessel ............................. 200/148 |
| 3,425,450 | 2/1969 | Pawling ......................... 137/630.22 |
| 3,439,711 | 4/1969 | Sherwood et al. ............ 137/630.15 |
| 3,457,387 | 7/1969 | Nelson et al. ...................... 219/125 |
| 3,495,057 | 2/1970 | Golota ................................ 200/148 |
| 3,678,241 | 7/1972 | Erlandson et al. .................. 219/72 |
| 4,295,596 | 10/1981 | Doten et al. .................... 228/180.2 |
| 4,300,715 | 11/1981 | Keizer et al. ....................... 228/180 |
| 4,444,352 | 4/1984 | Glascock et al. .............. 228/219 X |
| 4,610,388 | 9/1986 | Koltuniak et al. ................. 228/6.2 |

FOREIGN PATENT DOCUMENTS 43655  4/1978  Japan .

*Primary Examiner*—Nicholas P. Godici
*Assistant Examiner*—Carmine Cuda
*Attorney, Agent, or Firm*—Lawrence A. Maxham; Edward B. Johnson

[57] ABSTRACT

Apparatus and method for providing a floating seal for an inert gas solder reflow chamber. The seal floats with respect to upper and lower chucks and is made of a substantially non-deformable material. The seal permits lateral, axial and rotational movement between the lower and upper chucks while facilitating accurate control of bonding pressure. The structure of this floating seal permits use of seal materials which facilitate use of higher melting point solders, some in excess of 350° C., for flip-chip bonding.

20 Claims, 3 Drawing Figures

FLOATING SEAL AND METHOD OF ITS USE

FIELD OF THE INVENTION

This invention relates generally to inert gas solder reflow chambers for flip-chip bonding, and more particularly to a novel seal arrangement which permits free movement of one chuck with respect to the other for alignment purposes, enables the use of operating temperatures in excess of 350° C. and facilitates accurate control of bonding pressure between the circuit and the substrate.

DISCUSSION OF THE PRIOR ART

The recent shrinkage of electronic device geometries on integrated circuits has resulted in significant increases in on-chip electronic functional density and speed. However, these advances in performance are rapidly becoming limited by the large number of long interconnections required to route signals and power to and from the chip. These numerous interconnections are predominantly made to input/output (I/O) ports located about the perimeter of the chip. Consequently, the chip dimensions have become pad-limited and have not undergone a proportional reduction in size corresponding to the present achievement of submicron device geometries.

The result of the above stated situation is that the off-chip functional density and speed have lagged behind the on-chip functional density and speed. Solutions to these problems are offered by two competing technologies in which the chip itself is regarded as the package. They are: (1) silicon-on-silicon flip-chip which offers the smallest possible footprint, and (2) tape automated bonding (TAB). Both of these technologies require the wafer to have vertical electrical interconnections, or solder bumps, at locations defined by the I/O pads on a substrate. Flip-chip bonding is the subject to which this invention is addressed.

Flip-chip bonding is a method of attaching a microelectronic circuit, which has an array of solder bumps for establishing input and output connections, to a mating substrate which has a mirror image array of pads to which the solder bumps are to be connected, normally by a reflow process. It is preferable that reflow occur in an inert or reducing atmosphere so that oxides are reduced, or at least do not form at the soldered junctions. Oxidization of the soldered connections will inhibit good electrical contact and reduce the mechanical strength of the soldered joints.

Flip-chip bonding is typically carried out at temperatures in the range of 200° C. through the use of infrared aligner bonder equipment designed for this purpose. The aligner bonder facilitates alignment of the microelectronic circuit to the substrate, provides a means of heating the substrate to reflow temperature, forces the two parts together and then cools the parts to effect the bond.

To reduce oxide formation, reflow is carried out in an inert atmosphere reflow chamber. In a typical structure, the reflow chamber consists of an upper and a lower chuck and a deformable gasket between them sealing off the perimeter of the chamber from the surrounding atmosphere. The aligner bonder holds the microelectronic circuit in the upper chuck by means of a vaccum, with the solder bumps facing downwardly. The substrate is mounted in the lower chuck with the interconnecting pads facing upwardly. The gasket fits between the upper and lower chucks around the chamber perimeter so that when the chucks are brought into confronting face-to-face relationship, a gas-tight seal is made. Inert or reducing gas can then be used to purge the air-tight chamber, thereby producing the required atmosphere for reflow.

To insure process uniformity, the bonding pressure must be monitored. Pressure is typically determined by means of a force transducer between the lower chuck and a pneumatic ram which applies the external bonding pressure. However, the force measured by the transducer is the sum of three forces. One is the actual bonding force between the circuit and the substrate. Additionally, there are the weight of the lower chuck and the force exerted on the chucks by the compressed gasket. While the weight of the lower chuck is a constant, it is very difficult to determine the gasket force because that value is a function of both the amount of deformation of the gasket and the ambient temperature. For this reason, in such prior art devices, bonding pressure can only be approximated.

Another limitation on the prior art device is that the upper temperature limit is determined by the gasket material. Materials suitable for gaskets used in the devices of the type described above are polytetrafluoroethylene (PTFE) or neoprene. These typical gasket materials are limited to temperatures below about 260° C. This temperature has been found satisfactory for normal solder reflow operations. However, in situations where the finished equipment could be subject to temperature extremes, it is desirable to employ solders having significantly higher reflow temperatures. Such solders enable electronic apparatus to maintain physical and electrical stability even when subjected to temperatures which could degrade electrical connections formed with solder having a normal reflow temperature characteristic.

SUMMARY OF THE INVENTION

Broadly speaking, this invention is for a reflow chamber having a novel seal adapted to overcome the limitations of the prior art solder reflow apparatus.

More particularly, the reflow chamber of this invention includes a floating seal made of substantially non-deformable material such as cast iron. The upper and lower chucks are made of material appropriate for such elements. Not only does the sealing material enable the use of substantially higher reflow temperatures, the sealing structure in relation to the chucks facilitates accurate pressure monitoring to enable direct readings of bonding pressures to be made.

The non-deformable sealing member is retained in the upper chuck in an arrangement permitting limited telescopic relative motion therebetween. The electronic circuit chip and the substrate are mounted to the respective chucks which are then brought into confronting relationship with the surface of the lower chuck engaging the protruding surface of the sealing member and causing slight telescopic motion into the upper chuck. The substrate and electronic circuit are aligned by conventional means, the sealing member permitting lateral and rotational motion of one chuck with respect to the other for this alignment purpose. When alignment is accomplished, the chucks are brought together so that the sealing member further telescopes into the upper chuck and appropriate bonding pressure is established between the circuit chip and the substrate.

Because there is no resilient connection between the sealing member and either chuck, direct measurement of bonding pressure can be made by means of a conventional transducer.

BRIEF DESCRIPTION OF THE DRAWING

The objects, advantages and features of this invention will be more readily understood from the following detailed description when read in conjunction with the accompanying drawing, in which.

DESCRIPTION OF THE PREFERRED EMBODIMENT

Figure 1:
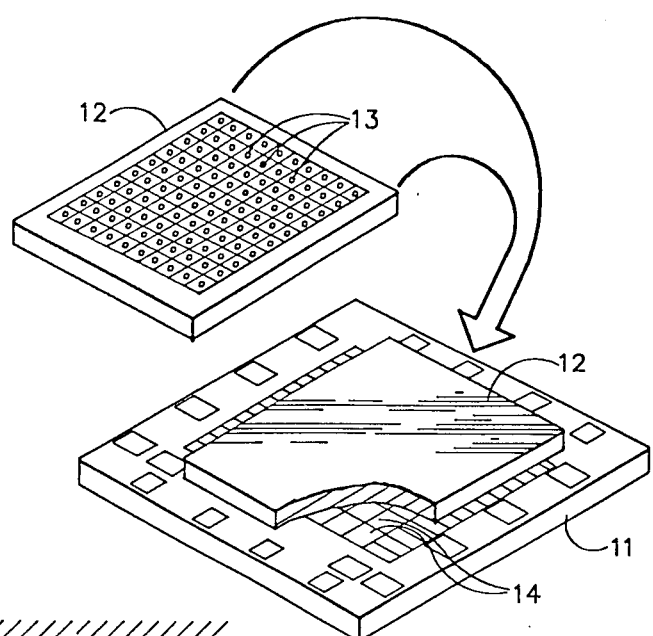
FIG. 1 shows in simplified form the flip-chip bonding process.

With reference now to the drawing and more particularly to FIG. 1 thereof, there is shown substrate 11 with microelectronic circuit chip 12 in a preliminary position above the substrate and as it would appear, in partial cut away view, after being mounted on the substrate. On the facing side of the chip, that is, the side facing upward in the preliminary position, are a large number of vertical electrical interconnections or solder bumps 13 which, when soldered by the reflow process to interconnecting pads 14 on the substrate, provides the input and output connections between the microelectronic circuit and the substrate.

From FIG. 1 it can easily be appreciated how the term flip-chip bonding originated.

Figure 2:
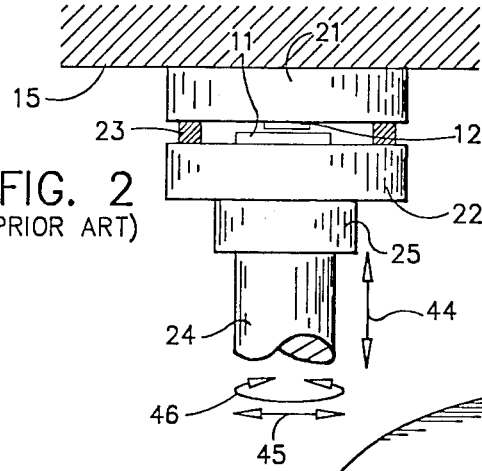
FIG. 2 is an elevational view of a conventional flip-chip bonding apparatus.

The apparatus of FIG. 2 is representative of a prior art flip-chip aligner bonder. Microelectronic circuit 12 is secured to upper chuck 21 by suitable means such as by vacuum with the solder bumps facing downwardly. Lower chuck 22 has substrate 11 mounted thereto with interconnecting pads 14 facing upwardly toward the circuit chip. Deformable gasket 23 is positioned between the upper and lower chucks sealing off the perimeter from the surrounding atmosphere and establishing, between the gasket and the confronting faces of the upper and lower chucks, the reflow chamber when the chucks are brought together to form a gas-tight seal together with the gasket. Inert or reducing gas can then be used to purge the chamber to produce the required atmosphere for reflow.

In typical aligner bonder equipment, upper chuck 21 is fixed, such as to frame 15. Lower chuck 22 is movable axially (arrow 44), rotationally (arrow 46) and laterally (arrow 45) by appropriate conventional control mechanism, which is not shown, in connection with hydraulic ram 24. Force transducer 25 is positioned between the ram and the lower chuck and provides the means for monitoring bonding pressure. The transducer is connected to an indication device by appropriate means, which is not shown.

The flip-chip bonding process is typically accomplished in several steps. At initial setup, the microelectronic circuit and the substrate are positioned on the upper and lower chucks respectively, which are at that time separated from each other. The alignment step is accomplished by bringing the chucks together until the microelectronic circuit chip and the substrate are in confronting relationship but slightly spaced. At this time the gasket has made initial pressure contact between the two chucks substantially as shown in FIG. 2.

Using a conventional infrared viewing system and a vernier adjustable lower chuck, the substrate is brought into alignment with the circuit, with only slight compression on the gasket. At this point the reflow chamber has been formed between the gasket and the upper and lower chuck confronting faces.

The next step is to purge the reflow chamber with inert or reducing gas, followed by heating to reflow temperature, normally be means of resistance heaters in the lower chuck. The injected gas may also be at an elevated temperature for supplemental heating. After the substrate reaches reflow temperature, the lower chuck is raised against the fixed upper chuck until the circuit chip and substrate are under the correct bonding pressure as determined by the force transducer. This action further compresses the gasket.

Finally, after holding the heat and pressure for a predetermined but relatively short period of time to insure a good connection, the heat is removed, allowing the solder to solidify while under constant pressure. When the solder solidifies, the bond is made and the pressure is removed. The new hybridized assembly of microelectronic chip and substrate is then removed from the chucks.

To ensure process uniformity, the bonding pressure must be monitored. It is important to control the extent of collapse of solder bumps 13. The bumps must be deformed but not freely spread over the facing surfaces. Thus it is necessary that they be deformed only to a specific point. Since the interior of the chamber in which the chip and substrate reside is at reflow temperature, a relatively small force is necessary to obtain proper solder bump deformation.

The bonding pressure necessary for proper solder deformation is determined empirically for each solder alloy. Then that pressure must be repeatable so that quality production can be obtained.

The pressure measured by transducer 25 is the sum of three forces. One is the bonding force between the chip and the substrate, another is the weight of the lower chuck, and the third is the force exerted on the chucks by the compressed gasket. With this apparatus, bonding pressure can only be approximated because the gasket force is a function of both the amount of deformation and temperature. Thus quality production is not assured, even after the optimum bonding pressure is established.

Another important factor to which this invention is addressed is reflow temperature. Previously used solder alloys functioned well at a reflow temperature of approximately 200° C. However, it is desirable in some situations to employ a solder having a substantially higher reflow temperature. This enables the electronic circuitry to withstand higher temperatures without potential loss of physical and electrical contact. The material of deformable gasket 23 in the FIG. 2 apparatus has been a temperature limiting factor in many prior art devices.

Figure 3:
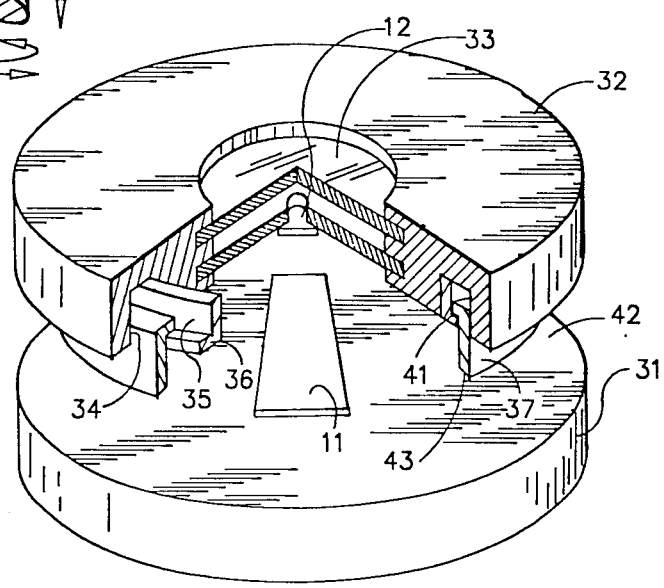
FIG. 3 is a perspective, partially cut away view of the flip-chip bonding apparatus of this invention.

The structure of the invention which enables substantially increased upper temperature limits and improves the bonding pressure monitoring accuracy is shown in FIG. 3. Lower chuck 31 is mounted to a ram and a force transducer as shown in FIG. 2. It is not necessary to show these elements in FIG. 3. Upper chuck 32 is provided with infrared viewing window 33, with microelectronic chip 12 being centered and retained on the under side of the viewing window. Substrate 11 is shown mounted to lower chuck 31.

The upper chuck is formed with an annular groove 34 in which is mounted retaining ring 35 having a lower lip 36. Floating seal 37 has an inverted L-shaped cross-section with upper shoulder element 41 engaging lip 36. Retaining ring 35 is fixed to the upper chuck while the seal 37 rotationally and vertically floats in groove 34. Shoulder element 41 contacts lip 36 to limit its downward motion, and the upper motion is limited by the depth of the groove. In order to provide the relatively gas-tight chamber, there is a close tolerance between seal 37 and retaining ring 35 in groove 34.

The floating seal is made of a non-deformable material such as cast iron and has a smooth outwardly projecting annular surface 43 which comes into sliding contact with the smooth upper surface 42 of lower chuck 31. A seal is established at the interface of these surfaces only due to the force of gravity acting on the seal. During the reflow processing, the sealing ring is pushed upwardly somewhat into groove 34. It is so designed that under normal processing, the upper edge of the ring does not make contact with the base of the groove.

The reflow processing described above with respect to FIG. 2 is modified somewhat with the structure of this invention, as shown in FIG. 3. In the setup step, with the lower and upper chucks separated, seal 37 hangs from the upper chuck, held in place by the retaining ring. During alignment the lower chuck is first brought into close proximity with the upper chuck. The lower chuck makes contact with annular surface 43 of floating seal 37 and pushes it a short distance in telescoping fashion into the upper chuck. Then with vernier adjustments conventionally made in conjunction with the typical infrared viewing system, the lower chuck is adjusted rotationally and transversely to bring the microelectronic circuit chip into substantially perfect alignment with the substrate. As the lower chuck is shifted during this alignment process, the seal glides over the smooth upper surface of the lower chuck, all the while maintaining the gas-tight seal. It is also possible, in the embodiment of FIG. 3, that seal 37 will rotate in groove 34 during alignment, but it is not significant whether or not it does so.

After alignment has been completed, the reflow chamber is purged with inert or reducing gas as before and the substrate is then heated to a desired temperature. However, by making the floating seal out of appropriate material, the temperature can be substantially elevated to 350° C. or beyond. This provides significant advantages by permitting use of solders having higher melting temperatures.

As the pneumatic ram is activated to bring the substrate into contact with the circuit, the floating seal telescopes further into the upper chuck. As can be appreciated, while the force transducer is subject to three forces, those being the bonding force, the weight of the lower chuck and the weight of the floating seal, the latter two elements can be zeroed out because they are constant. The seal is floating so it is only subject to the force of gravity and not to a variable resilient force. The result is a direct reading of the applied bonding pressure between the substrate and the microelectronic circuit.

Although the floating seal is shown as an annular device in FIG. 3, there is no limitation as to the shape of the seal and reflow chamber. Any other desired shape, which is circumferentially contiguous, and other materials, may be employed which will enable the invention to be practiced as described. Further, it may be possible that the lower chuck be fixed and the upper chuck be movable. Other structures could be used to permit the seal to float with respect to the upper chuck. Additionally, the force transducer could be mounted to either chuck.

There are several advantages of this invention which result directly from the structure of FIG. 3. By employing a floating seal, there is no inhibition of the free movement of the lower chuck with respect to the upper chuck during alignment. It can easily be seen why there would be some friction related restriction with the structure of FIG. 2. By using appropriate materials, the operating temperature range of the reflow chamber can be increased substantially to well beyond 350° C. as desired. Additionally, the structure improves the accuracy of bonding pressure monitoring. It allows direct reading of the bonding force during reflow without need to account for variables such as temperature and amount of deformation of the previously used deformable gasket.

The above description has been with respect to thermal reflow with a predetermined relatively low bonding pressure. The apparatus of FIG. 3 could also be advantageously employed for thermocompression bonding. In this process, the chamber and circuit are pre-heated to less than reflow temperature and the bonding pressure is greater than with the reflow process. The solder is somewhat softened but there is no flow and pressure is used to create the bond. Cold compression bonding is also possible, requiring a relatively high bonding pressure. Certain solders can make a strong connection by means of pressure alone, without added heat. One example is an indium solder. Thermocompression can be used with lead/indium and gold solders. Reflow soldering works well with tin/lead and gold/germanium solders, for example. In any of these processes, accurate pressure monitoring is important.

In view of the above description, it is likely that modifications and improvements will occur to those skilled in the art which are within the scope of the accompanying claims.

What is claimed is:

1. Apparatus for providing a floating seal for an inert gas reflow chamber, said apparatus comprising:

an upper chuck adapted to retain a first workpiece intended to be secured to another;

a lower chuck adapted to retain a second workpiece to which the first workpiece is intended to be secured, said upper and lower chucks being adapted to move said workpieces axially with respect to each other;

floating sealing means located between said upper and lower chucks; and means for mounting said sealing means to said upper chuck for limited free axial movement with respect to said upper chuck, and for selectively free rotational and lateral movement with respect to said lower chuck;

whereby upon said sealing means being in sealing contact with both said upper and lower chucks, said upper and lower chucks and said sealing means form a sealed chamber, and selective rotational, lateral and axial adjustments may be made between the relative positions of said chucks while maintaining the integrity of said sealed chamber.

2. The apparatus recited in claim 1, wherein said mounting means permits sufficient axial movement of said sealing means, while maintaining the integrity of said sealed chamber, to enable one chuck to move axially with respect to the other to establish and maintain predetermined and controlled bonding pressure between said first and said second workpieces.

3. The apparatus recited in claim 2, and further comprising means for directly measuring the bonding pressure between said first and second workpieces.

4. The apparatus recited in claim 3, wherein said measuring means comprises a force transducer on one of said chucks, the force of said floating seal between said upper and lower chucks being a constant.

5. The apparatus recited in claim 1, wherein said sealing means, in the absence of upward force by said lower chuck, is subject only to the force of gravity with respect to said upper chuck.

6. The apparatus recited in claim 5, wherein the sealing pressure between said sealing means and said lower chuck is constant when said sealing means and said lower chuck are in contact.

7. The apparatus recited in claim 1, wherein after the sealed chamber is established, said mounting means permits said floating seal to slide on the surface of said lower chuck as it is moved laterally and rotated to establish alignment of said first and second workpieces.

8. The apparatus recited in claim 1, wherein said upper chuck is formed with a downwardly facing groove, said sealing means comprises a circumferentially contiguous member telescopically secured in said groove in said upper chuck and extending downwardly therefrom under the force of gravity, said mounting means retaining said sealing means at least partially within said groove.

9. The apparatus recited in claim 1, wherein said upper and said lower chucks and said sealing means are formed of materials which withstand operating temperatures in the sealed chamber in excess of 350° C.

10. The apparatus recited in claim 1, wherein the sealing pressure between said sealing means and said lower chuck is constant when said sealing means and said lower chuck are in contact.

11. The apparatus recited in claim 10, wherein the sealing pressure remains constant as said lower and upper chucks are moved axially together and apart within predetermined limits.

12. The apparatus recited in claim 1, wherein said sealing means remains floating after the sealed chamber is formed.

13. A method for reflow soldering in an inert gas chamber formed of an upper chuck, a lower chuck and a substantially non-deformable sealing member, said method comprising the steps of:
mounting said sealing member to said upper chuck for limited free axial movement with respect thereto;
separating said upper and lower chucks;
mounting a first workpiece to said upper chuck;
mounting a second workpiece to said lower chuck;
moving one of said chucks with respect to the other to a position where said lower chuck contacts a protruding surface of said sealing member and pushes said sealing member telescopically into said upper chuck for a portion of its possible axial movement, thereby forming the sealed chamber but with the first and second workpieces being still in spaced confronting relationship;
purging the sealed chamber with inert or reducing gas;
axially moving said lower chuck with respect to said upper chuck to establish a predetermined bonding pressure contact of said first workpiece with said second workpiece, thereby moving said sealing member telescopically further into said upper chuck but still within the limits of its range of motion; and
directly measuring the bonding force between said first and second workpieces by means of a force transducer.

14. The method recited in claim 13, wherein said sealing member is maintained in a floating condition with respect to said upper and lower chucks throughout the reflow soldering process.

15. The method recited in claim 13 and, after the step of moving said chucks together, comprising the further step of rotationally and laterally moving one chuck with respect to the other to bring said first and second workpieces into substantially perfect alignment, said sealing member slidingly engaging said lower chuck during said alignment step.

16. The method recited in claim 15, wherein the sealing pressure between said sealing member and said lower chuck is constant while the integrity of the sealed chamber is maintained.

17. The method recited in claim 13, wherein the downward force on said sealing member with respect to both said chucks is substantially only the force of gravity.

18. The method recited in claim 13, and comprising the further step of heating at least one of said workpieces in the sealed chamber before the bonding pressure is applied.

19. The method recited in claim 18, wherein said workpiece is heated to a predetermined reflow temperature.

20. The method recited in claim 13, wherein the sealing pressure between said sealing member and said lower chuck is constant while the integrity of the sealed chamber is maintained.

* * * * *